C. H. GIESE.
WATER HEATING APPLIANCE FOR GAS STOVES.
APPLICATION FILED AUG. 16, 1913.
1,111,148.
Patented Sept. 22, 1914.
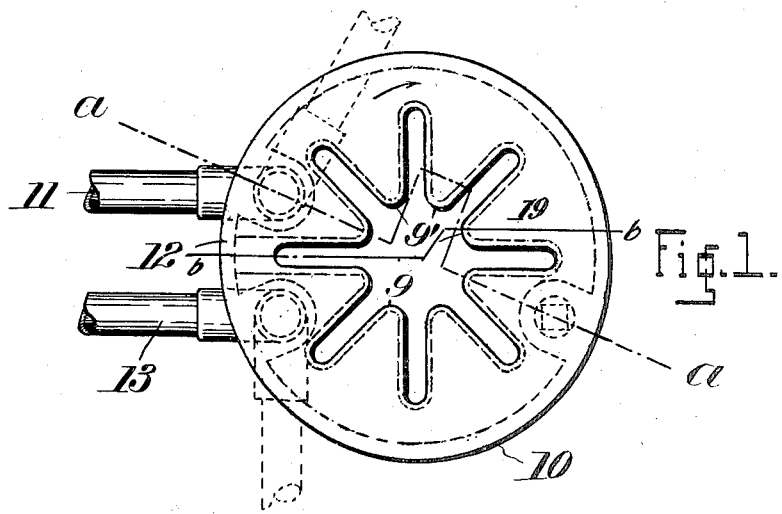
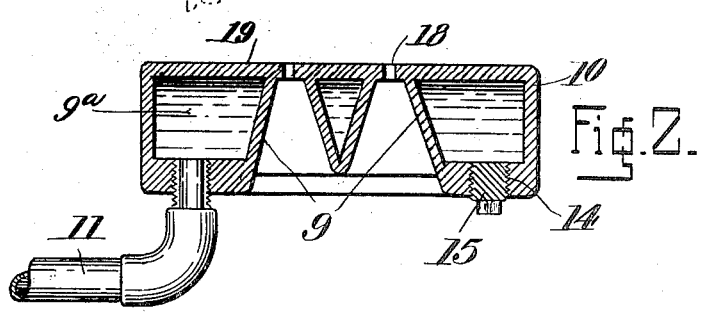
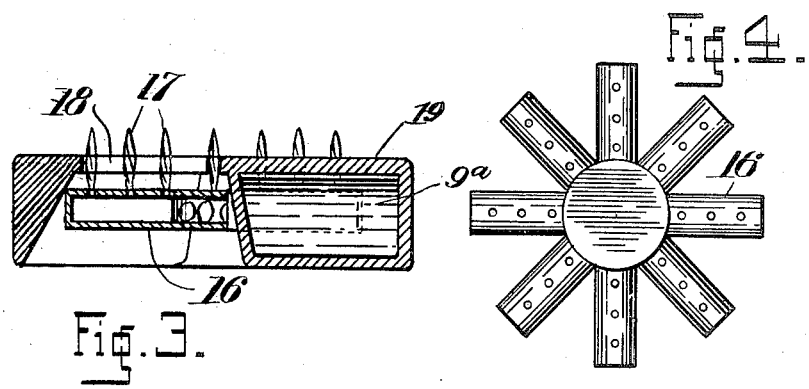
WITNESSES:
Raymond King
INVENTOR
Charles H. Giese
ATTORNEYS

UNITED STATES PATENT OFFICE.

CHARLES H. GIESE, OF NEWARK, NEW JERSEY.

WATER-HEATING APPLIANCE FOR GAS-STOVES.

1,111,148.　　　　Specification of Letters Patent.　　Patented Sept. 22, 1914.

Application filed August 16, 1913. Serial No. 785,183.

*To all whom it may concern:*

Be it known that I, CHARLES H. GIESE, citizen of the United States, residing at Newark, in the county of Essex and State of New Jersey, have invented certain new and useful Improvements in Water-Heating Appliances for Gas-Stoves, of which the following is a specification.

This invention relates to water heating appliances for gas stoves or the like.

One object of the invention is to provide an appliance which may be readily applied to or fitted over a gas stove or the like for the purpose of heating water which may be utilized for heating, washing or other purposes.

Another object resides in the provision of a water heating appliance in which the water may be heated by a gas or like stove, while the stove is being utilized for cooking purposes, and the hot water conveyed to a boiler, or for that matter, conveyed to any suitable place for any desired purpose.

A still further object is to provide a hot water heating appliance for gas or like stoves embodying among other characteristics means whereby water entering the appliance is effectually heated prior to its discharge therefrom and which may derive its heat from the gas stove or the like whether the stove be employed for cooking purposes or solely for the purpose of heating the water.

With the above and other objects in view the present invention consists in the combination and arrangement of parts hereinafter more fully described, illustrated in the accompanying drawings and particularly pointed out in the appended claims, it being understood that changes may be made in the form, proportion, size and minor details without departing from the spirit or sacrificing any of the advantages of the invention.

In the drawings:—Figure 1 is a top plan view of the water heating appliance. Fig. 2 is a vertical sectional view on the line a—a of Fig. 1. Fig. 3 is a vertical sectional view of the appliance fitted over the burner of a gas stove or the like. Fig. 4 is a plan view of the burner of a gas stove or the like.

Referring now to the accompanying drawings, my improved appliance is shown as composed of a hollow casing including inner and outer walls 9 and 10, the outer wall being preferably circular in formation and the inner wall being more or less irregular in that it is provided with a plurality of radial hollow projections 9′ affording an efficient radiation of heat for the purpose of heating water let into the chamber 9ᵃ between the inner and outer walls by way of the pipe 11 leading from any water supplying source. There is a partition 12 leading from the inner surface of the outer wall 10 to one of the radial hollow portions of the inner wall 9 so that as the water enters the chamber 9ᵃ it is caused to flow in the direction of the arrow indicated in Fig. 1 through the interspace and finally pass out of the interspace by way of the outlet pipe 13. Thus the inlet pipe 11 is arranged to enter the heating appliance on one side of the partition 12 while the outlet pipe 13 connects with the chamber 9ᵃ of the heating appliance on the opposite side of the partition 12. The water is thus caused to circulate practically entirely around the interspace 9ᵃ and by virtue of the radiating hollow portions 9′ of the inner wall 9 an effective radiation of heat is insured to properly heat the water. The inlet and outlet pipes 11 and 13 are preferably connected to the appliance through the bottom of the latter and they preferably have screw threaded connection with the appliance as shown in Fig. 2 so as to provide for an adjustment of the inlet and outlet pipe connections and so that the inlet and outlet pipe connections may be disposed at various angles with relation to the appliance as indicated by dotted lines in Fig. 1. As shown in Fig. 2 a screw threaded opening 14 may be provided in the heating appliance and plugged by a screw threaded plug 15 so that if it be desired to add another inlet or outlet pipe connection it may be readily accomplished.

The burner 16 shown in Figs. 3 and 4 of the star type is shown as associated with my improved hot water heating appliance. As shown in Fig. 3 the flame 17 from the burner may pass through the apertures 18 in the top 19 of the appliance on which top vessels of various characters may be disposed for cooking purposes, but these apertures are of a width sufficient to prevent contact of the flames from the burner 16 therewith. By this means the flames contact directly with the cooking vessels and are not decreased in their intensity by contact with any other object. The heat radiating from the flames 17 during their passage through the apertures 18 is sufficient, however, to heat the water. The inner wall 9 including its projecting portions 9' are preferably flared as indicated in Figs. 2 and 3 for engagement with the burner, providing a means for supporting the said heating appliance.

What is claimed is:—

1. In a device such as described, the combination of a casing having a plurality of water passages, and a burner having radial arms the terminals of which engage the casing between said water passages, said casing having apertures formed therein disposed between the water passages and positioned to prevent the contact of flames from the burner with the casing.

2. In a device such as described, a casing having radial water passages, provided with inclined walls and spaced inlet and outlet openings and a burner having radial arms the terminals of which engage the inclined walls of the casing between said water passages, whereby the casing will be supported upon the burner, said casing having radial apertures disposed therein between the radial water passages and above the radial arms of the burner, whereby the flames from said burner will pass through the apertures in the casing out of contact with the inclined walls.

3. In a water heater the combination with a burner including radial arms, of a casing having a plurality of radial water passages, said radial arms engaging the casing between said radial water passages, said casing having apertures formed therein between the radial water passages and positioned to permit passage of the flames from the burner therethrough, out of contact with the walls of said water passages, said casing having inlet and outlet openings formed therein and arranged relatively close to adjacent radial water passages, a partition arranged between the inlet and outlet openings, whereby water will pass into the casing upon one side of the partition and through the radial water passages to the opposite side of the partition.

In testimony whereof I affix my signature in presence of two witnesses.

CHARLES H. GIESE.

Witnesses:
BRUNO REICHETS,
WILLIAM HILL.